United States Patent
Dorum et al.

(10) Patent No.: US 11,227,502 B2
(45) Date of Patent: Jan. 18, 2022

(54) METHOD AND APPARATUS FOR DYNAMICALLY DETERMINING A DESTINATION OF A DRONE

(71) Applicant: HERE Global B.V., Eindhoven (NL)

(72) Inventors: Ole Henry Dorum, Chicago, IL (US); Frank Kozak, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 252 days.

(21) Appl. No.: 16/363,380

(22) Filed: Mar. 25, 2019

(65) Prior Publication Data
US 2020/0312161 A1    Oct. 1, 2020

(51) Int. Cl.
*G08G 5/00* (2006.01)
*B64C 39/02* (2006.01)

(52) U.S. Cl.
CPC ......... *G08G 5/0069* (2013.01); *B64C 39/024* (2013.01); *G08G 5/0039* (2013.01); *B64C 2201/141* (2013.01)

(58) Field of Classification Search
CPC .. G08G 5/0069; G08G 5/0039; B64C 39/024; B64C 2201/123
See application file for complete search history.

(56) References Cited

U.S. PATENT DOCUMENTS 9,828,092 B1    11/2017 Navot et al.
9,950,814 B1 *  4/2018 Beckman ............ B61L 15/0027
2015/0336669 A1 * 11/2015 Kantor ................ G08G 5/0013
                                                      701/3
2017/0038779 A1 *  2/2017 Fujimori ............... B64C 39/024
2017/0160735 A1 *  6/2017 Mikan .................. G08G 5/0034
2017/0220041 A1 *  8/2017 Tanaka ............... H04B 7/18506
2017/0240276 A1    8/2017 Zilberstein
2017/0313332 A1 * 11/2017 Paget ..................... H04N 7/183
2017/0343645 A1   11/2017 Kim et al.
2018/0002018 A1 *  1/2018 Jourdan ............... G05D 1/0088

(Continued)

FOREIGN PATENT DOCUMENTS

WO    WO2016022646       * 2/2016  ............. B64C 39/02
WO    WO2018048854       * 3/2018  ............. B64C 19/00
WO    WO2018048854 A1   * 3/2018  ........... G05D 1/0676

OTHER PUBLICATIONS

Ackerman, E., *DARPA's Semi-Disposable Gremlin Drones Will Fly by 2019—IEEE Spectrum*, [online] [retrieved May 14, 2019]. Retrieved via the Internet: <URL: https:/spectrum.ieee.org/automaton/robotics/military-robots/darpas-semidisposable-gremlin-drones-will-fly-by-2019>. (dated May 9, 2018) 2 pages.

(Continued)

*Primary Examiner* — Peter D Nolan
*Assistant Examiner* — Kenneth M Dunne
(74) *Attorney, Agent, or Firm* — Alston & Bird LLP

(57) ABSTRACT

The destination for a drone is dynamically deteremined. In the context of a method, location-related data may be collected with a drone. After having collected at least some of the location-related data, a destination for the drone is determined based at least in part upon a location of the drone. The drone is then caused to travel from the location to the destination. In some instances, the drone may travel toward the destination by being carried by a vehicle that is traveling along a route toward the destination.

26 Claims, 5 Drawing Sheets

(56) References Cited

U.S. PATENT DOCUMENTS

| | | | |
|---|---|---|---|
| 2018/0150072 A1* | 5/2018 | Boss | G08G 5/025 |
| 2018/0158197 A1* | 6/2018 | Dasgupta | G06K 9/726 |
| 2019/0088144 A1* | 3/2019 | Argo | G08G 5/025 |
| 2020/0356114 A1* | 11/2020 | Ucar | B64C 39/024 |

OTHER PUBLICATIONS

Jotham, I., *This Disposable Drone Hides Inside the Shell of a "Fake" Bomb and Can be Dropped From a Fighter Jet* [online] [retrieved May 14, 2019]. Retrieved via the Internet: <URL: https://www.ibtimes.co.uk/this-disposable-drone-hides-inside-shell-fake-bomb-can-be-dropped-fighter-jet-1650909>. (dated Dec. 10, 2017) 2 pages.

Leopold, G., *Navy Readies Swarming Micro-Drones—Defense Systems* [online] [retrieved May 14, 2019], Retrieved via the Internet: <URL: https:/defensesystems.com/articles/2017/04/17/cicada.aspx> (dated Apr. 17, 2017) 5 pages.

Pounds, P. E. I., *Paper Plane Towards Disposable Low-Cost Folded Cellulose-Substrate UAVs*, Proceedings of Australasian Conference on Robotics and Automation (dated Dec. 2012), 9 pages.

Skurie, J., *Cheap, Disposable Drones Are the New Storm Chasers*, [online] [retrieved May 14, 2019], Retrieved via the Internet: <URL: https://news.nationalgeographic.com/news/2013/13/130725-drone-uav-uas-disposable-wildfire-storm-chasers>. (dated Jul. 26, 2013) 2 pages.

\* cited by examiner

METHOD AND APPARATUS FOR DYNAMICALLY DETERMINING A DESTINATION OF A DRONE

TECHNOLOGICAL FIELD

An example embodiment relates generally to the utilization of drones and, more particularly, to a method, apparatus and computer program product for dynamically determining the destination of a drone after the drone has been launched.

BACKGROUND

Location-related data is advantageously collected for purposes of creating and updating maps as well as for a wide variety of other purposes. For example, location-related data may identify new roads or changes to existing roads. Additionally, the location-related data may identify various attributes of roads including, for example, the posted speed limits associated with different portions of the roads.

Location-related data may be collected in various manners, such as by vehicles that traverse the roads. Drones may also be utilized in order to collect location-related data. However, the utility of drones for purposes of the collection of location-related data is hindered by limitations on the effective range of the drones. In this regard, a drone has a source of energy, such as one or more batteries and/or a supply of fuel, that powers the drone following deployment. As such, the range over which a drone may collect location-related data is limited by the source of energy carried by the drone since the drone must reserve enough energy to return to its home base prior to running out of energy. Consequently, a drone may be collecting useful location-related data regarding a new road but may have to halt further collection of the location-related data prior to traversing along the entirety of the new road in order to have sufficient energy to return to its home base. Thus, while the collection of location-related data by a drone is useful, the utility of drones for the collection of location-related data remains limited by the supply of energy carried by a drone.

While the range of the drone may be extended by carrying additional batteries or fuel on board the drone, the resulting drone may generally be more expensive and may also generally be heavier, thereby likely consuming more battery power or fuel and decreasing the efficiency with which the drone operates. Even with additional batteries or fuel, the range of the drone, while somewhat extended, will still be limited which, in turn, will correspondingly restrict the location-related data that may be collected by the drone.

BRIEF SUMMARY

A method, apparatus and computer program product are provided in accordance with an example embodiment in order to dynamically determine the destination of a drone after the drone has been deployed and collected at least some location-related data. As such the drone of this example embodiment need not return to the site from which the drone was launched but can, instead, dynamically determine the destination while in the field, thereby permitting the drone to travel to a destination that is closer to its current location and increasing the amount of time that the drone is able to collect location-related data. By dynamically determining the destination of the drone, the method, apparatus and computer program product of an example embodiment need not know in advance the route that the drone will follow following deployment such that the drone has greater freedom in the collection of the location-related data.

In an example embodiment, a method is provided that includes collecting location-related data with a drone that accompanies an entity in motion as the entity travels. For example, the entity may be a vehicle or a person and the drone may be configured to follow the person or the vehicle. While the drone accompanies the entity as the entity travels, the method determines a destination for the drone based at least in part upon a location of the drone during travel of the drone. The method also causes the drone to deviate from the entity to travel to the destination.

In an embodiment in which the entity in motion is a vehicle, the drone may be configured to be located on the vehicle while collecting location-related data. The method of an example embodiment determines the destination with reference to information defining respective locations of a plurality of candidate destinations, such as one or more of disposal sites, recycling stations, recharging stations or collection sites. In an example embodiment, the method determines the destination based at least in part upon a remaining range of the drone. The method of this example embodiment may cause the drone to deviate from the entity in motion while the destination is within the remaining range of the drone. In an example embodiment, the method collects the location-related data with the drone that travels along with the entity in motion such that the location of the drone is dependent upon a route of the entity and is unknown to the drone in advance.

In another example embodiment, an apparatus is provided that includes at least one processor and at least one non-transitory memory including computer program code instructions stored therein with the computer program code instructions configured to, when executed by the at least one processor, cause the apparatus at least to collect location-related data with a drone that accompanies an entity in motion as the entity travels. For example, the entity may be a vehicle or a person and the drone may be configured to follow the person or the vehicle. While the drone accompanies the entity as the entity travels, the computer program code instructions are configured to, when executed by the at least one processor, cause the apparatus to determine a destination for the drone based at least in part upon a location of the drone during travel of the drone. The computer program code instructions are also configured to, when executed by the at least one processor, cause the apparatus to cause the drone to deviate from the entity to travel to the destination.

In an embodiment in which the entity in motion is a vehicle, the drone may be configured to be located on the vehicle while collecting location-related data. The computer program code instructions are configured to, when executed by the at least one processor, cause the apparatus of an example embodiment to determine the destination with reference to information defining respective locations of a plurality of candidate destinations, such as one or more of disposal sites, recycling stations, recharging stations or collection sites. In an example embodiment, the computer program code instructions are configured to, when executed by the at least one processor, cause the apparatus to determine the destination based at least in part upon a remaining range of the drone. The computer program code instructions are configured to, when executed by the at least one processor, cause the apparatus of this example embodiment to cause the drone to deviate from the entity in motion while the destination is within the remaining range of the drone. In an example embodiment, the computer program code instructions are configured to, when executed by the at least one processor, cause the apparatus to collect the location-related data with the drone that travels along with the entity in motion such that the location of the drone is dependent upon a route of the entity and is unknown to the drone in advance.

In a further example embodiment, a computer program product is provided that includes at least one non-transitory computer-readable storage medium having computer-executable program code instructions stored therein with the computer-executable program code instructions including program code instructions configured to collect location-related data with a drone that accompanies an entity in motion as the entity travels. For example, the entity may be a vehicle or a person and the drone may be configured to follow the person or the vehicle. While the drone accompanies the entity as the entity travels, the computer-executable program code instructions also include program code instructions configured to determine a destination for the drone based at least in part upon a location of the drone during travel of the drone. The computer-executable program code instructions further include program code instructions configured to cause the drone to deviate from the entity to travel to the destination.

In an embodiment in which the entity in motion is a vehicle, the drone may be configured to be located on the vehicle while collecting location-related data. The program code instructions of an example embodiment are configured to determine the destination with reference to information defining respective locations of a plurality of candidate destinations, such as one or more of disposal sites, recycling stations, recharging stations or collection sites. In an example embodiment, the program code instructions are configured to determine the destination based at least in part upon a remaining range of the drone. The program code instructions of this example embodiment may be configured to cause the drone to deviate from the entity in motion while the destination is within the remaining range of the drone. In an example embodiment, the program code instructions are configured to collect the location-related data with the drone that travels along with the entity in motion such that the location of the drone is dependent upon a route of the entity and is unknown to the drone in advance.

In an example embodiment, a method is provided that includes collecting location-related data with a drone. After having collected at least some of the location-related data, the method includes determining a destination for the drone based at least in part upon a location of the drone. The method further includes causing the drone to travel from the location to the destination.

The method of an example embodiment determines the destination with reference to information defining respective locations of a plurality of candidate destinations, such as one or more of disposal sites, recycling stations, recharging stations or collection sites. In an example embodiment, the method determines the destination based at least in part upon a remaining range of the drone. The method of an example embodiment also includes causing the drone to travel along a route while collecting the location-related data and to cause the drone to travel from the location to the destination by causing the drone to deviate from the route while the destination is within the remaining range of the drone. The method of an example embodiment also includes determining a remaining supply of energy for the drone and, in an instance in which the remaining supply of energy for the drone is determined to be no greater than a threshold amount of energy, determining the destination for the drone.

In another example embodiment, an apparatus is provided that includes at least one processor and at least one non-transitory memory including computer program code instructions stored therein with the computer program code instructions configured to, when executed by the at least one processor, cause the apparatus at least to collect location-related data with a drone. After having collected at least some of the location-related data, the computer program code instructions are configured to, when executed by the at least one processor, cause the apparatus to determine a destination for the drone based at least in part upon a location of the drone. The computer program code instructions are further configured to, when executed by the at least one processor, cause the apparatus to cause the drone to travel from the location to the destination.

The computer program code instructions are configured to, when executed by the at least one processor, cause the apparatus of an example embodiment to determine the destination with reference to information defining respective locations of a plurality of candidate destinations, such as one or more of disposal sites, recycling stations, recharging stations or collection sites. The computer program code instructions are configured to, when executed by the at least one processor, cause the apparatus of an example embodiment to determine the destination by determining the destination based at least in part upon a remaining range of the drone. In an example embodiment, the computer program code instructions are further configured to, when executed by the at least one processor, cause the apparatus to cause the drone to travel along a route while collecting the location-related data. In this example embodiment, the computer program code instructions are configured to, when executed by the at least one processor, cause the drone to travel from the location to the destination by causing the drone to deviate from the route while the destination is within the remaining range of the drone. The computer program code instructions are further configured to, when executed by the at least one processor, cause the apparatus of an example embodiment to determine a remaining supply of energy for the drone and, in an instance in which the remaining supply of energy for the drone is determined to be no greater than a threshold amount of energy, the computer program code instructions are configured to, when executed by the at least one processor, cause the apparatus of this example embodiment to determine the destination for the drone.

In a further example embodiment, a computer program product is provided that includes at least one non-transitory computer-readable storage medium having computer-executable program code instructions stored therein with the computer-executable program code instructions including program code instructions configured to collect location-related data with a drone. After having collected at least some of the location-related data, the computer-executable program code instructions include program code instructions configured to determine a destination for the drone based at least in part upon a location of the drone. The computer-executable program code instructions further include program code instructions configured to cause the drone to travel from the location to the destination.

The program code instructions of an example embodiment are configured to determine the destination with reference to information defining respective locations of a plurality of candidate destinations, such as one or more of disposal sites, recycling stations, recharging stations or collection sites. In an example embodiment, the program code instructions are configured to determine the destination based at least in part upon a remaining range of the drone.

The computer-executable program code instructions of an example embodiment further include program code instructions configured to cause the drone to travel along a route while collecting the location-related data and the program code instructions configured to cause the drone to travel from the location to the destination include program code instructions configured to cause the drone to deviate from the route while the destination is within the remaining range of the drone. The computer-executable program code instructions of an example embodiment further include program code instructions configured to determine a remaining supply of energy for the drone and, in an instance in which the remaining supply of energy for the drone is determined to be no greater than a threshold amount of energy, to determine the destination for the drone.

In another embodiment, a method, apparatus and computer program product are provided in which a drone is caused to be carried by a vehicle toward the destination with the vehicle having been selected based upon the route traveled by the vehicle. By relying upon the vehicle to transport the drone at least part ways towards the destination, the time that the drone can utilize to perform its intended function, such as to collect location-related data, prior to travelling to the destination may be further increased.

In an example embodiment, a method is provided that includes determining that a vehicle is traveling along a route at least partly towards a destination. The method also includes causing a drone to be carried by the vehicle along at least a portion of the route toward the destination. After having been carried by the vehicle along at least the portion of the route, the method further includes causing the drone to depart from the vehicle and proceed toward the destination.

The method of an example embodiment determines that the vehicle is traveling along the route by determining the route based at least in part upon a location of the drone. In an example embodiment, the method determines that the vehicle is traveling along the route by determining the route of the vehicle based upon information defining respective routes of a plurality of vehicles. The destination of an example embodiment is one of a plurality of destinations. In this example embodiment, the method determines that a vehicle is traveling along a route at least partially towards a destination by selecting one destination of the plurality of destinations based on a current location of the drone and routes of the vehicles traveling toward at least some of the plurality of destinations. In an example embodiment, the drone is caused to be carried by and to subsequently depart from the vehicle such that a remaining range of the drone while being carried by the vehicle is sufficient to reach the destination following departure from the vehicle.

In another example embodiment, an apparatus is provided that includes at least one processor and at least one non-transitory memory including computer program code instructions stored therein with the computer program code instructions configured to, when executed by the at least one processor, cause the apparatus at least to determine that a vehicle is traveling along a route that extends at least partly towards a destination. The computer program code instructions are also configured to, when executed by the at least one processor, cause the apparatus to cause a drone to be carried by the vehicle along at least a portion of the route toward the destination. After having been carried by the vehicle along at least the portion of the route, the computer program code instructions are further configured to, when executed by the at least one processor, cause the apparatus to cause the drone to depart from the vehicle and proceed toward the destination.

The computer program code instructions are configured to, when executed by the at least one processor, cause the apparatus of an example embodiment to determine that the vehicle is traveling along the route by determining the route of the vehicle based at least in part upon a location of the drone. In an example embodiment, the computer program code instructions are configured to, when executed by the at least one processor, cause the apparatus to determine that the vehicle is traveling along the route by determining the route of the vehicle based upon information defining respective routes of a plurality of vehicles. In an example embodiment in which the destination is one of a plurality of destinations, the computer program code instructions are configured to, when executed by the at least one processor, cause the apparatus to determine that a vehicle is traveling along a route at least partly towards a destination by selecting one destination of the plurality of destinations based on a currently location of the drone and routes of vehicles traveling toward at least some of the plurality of destinations. The drone of an example embodiment is caused to be carried by and to subsequently depart from the vehicle such that a remaining range of the drone while being carried by the vehicle is sufficient to reach the destination following departure from the vehicle.

In a further example embodiment, a computer program product is provided that includes at least one non-transitory computer-readable storage medium having computer-executable program code instructions stored therein with the computer-executable program code instructions including program code instructions configured to determine that a vehicle is traveling along a route that extends at least partly towards a destination. The computer-executable program code instructions also include program code instructions configured to cause a drone to be carried by the vehicle along at least a portion of the route toward the destination. After having been carried by the vehicle along at least the portion of the route, the computer-executable program code instructions further include program code instructions configured to cause the drone to depart from the vehicle and proceed toward the destination.

The program code instructions of an example embodiment are configured to determine that the vehicle is traveling along the route by determining the route of the vehicle based at least in part upon a location of the drone. In an example embodiment, the program code instructions are configured to determine that the vehicle is traveling along the route by determining the route of the vehicle based upon information defining respective routes of a plurality of vehicles. The destination of an example embodiment is mobile such that a location of the destination changes over time. In an example embodiment in which the destination is one of a plurality of destinations, the program code instructions are configured to determine that a vehicle is traveling along a route at least partly towards a destination by selecting one destination of the plurality of destinations based on a currently location of the drone and routes of vehicles traveling toward at least some of the plurality of destinations. In an example embodiment, the drone is caused to be carried by and to subsequently depart from the vehicle such that a remaining range of the drone while being carried by the vehicle is sufficient to reach the destination following departure from the vehicle.

BRIEF DESCRIPTION OF THE DRAWINGS

Figure 1:
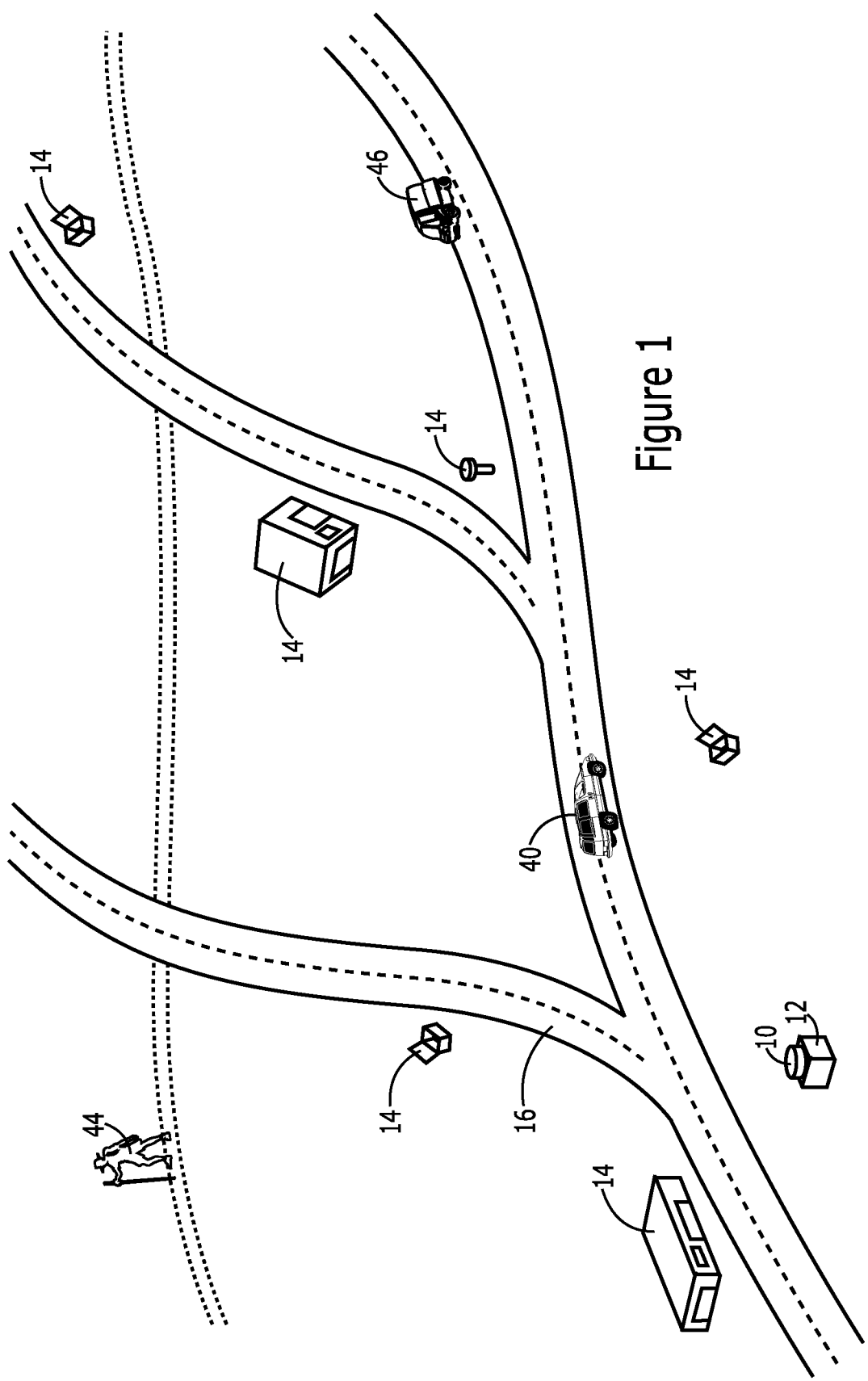
Figure 2:
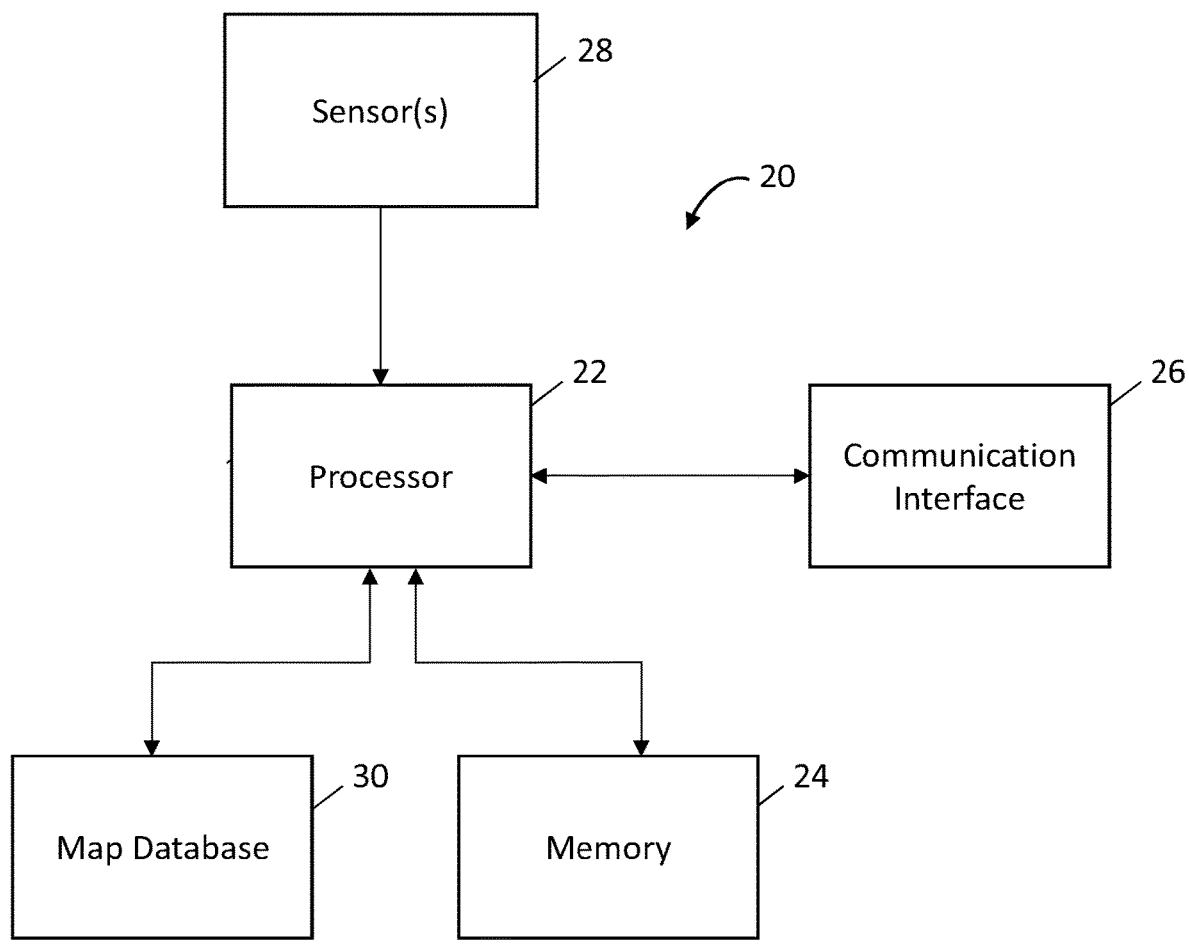
Figure 3:
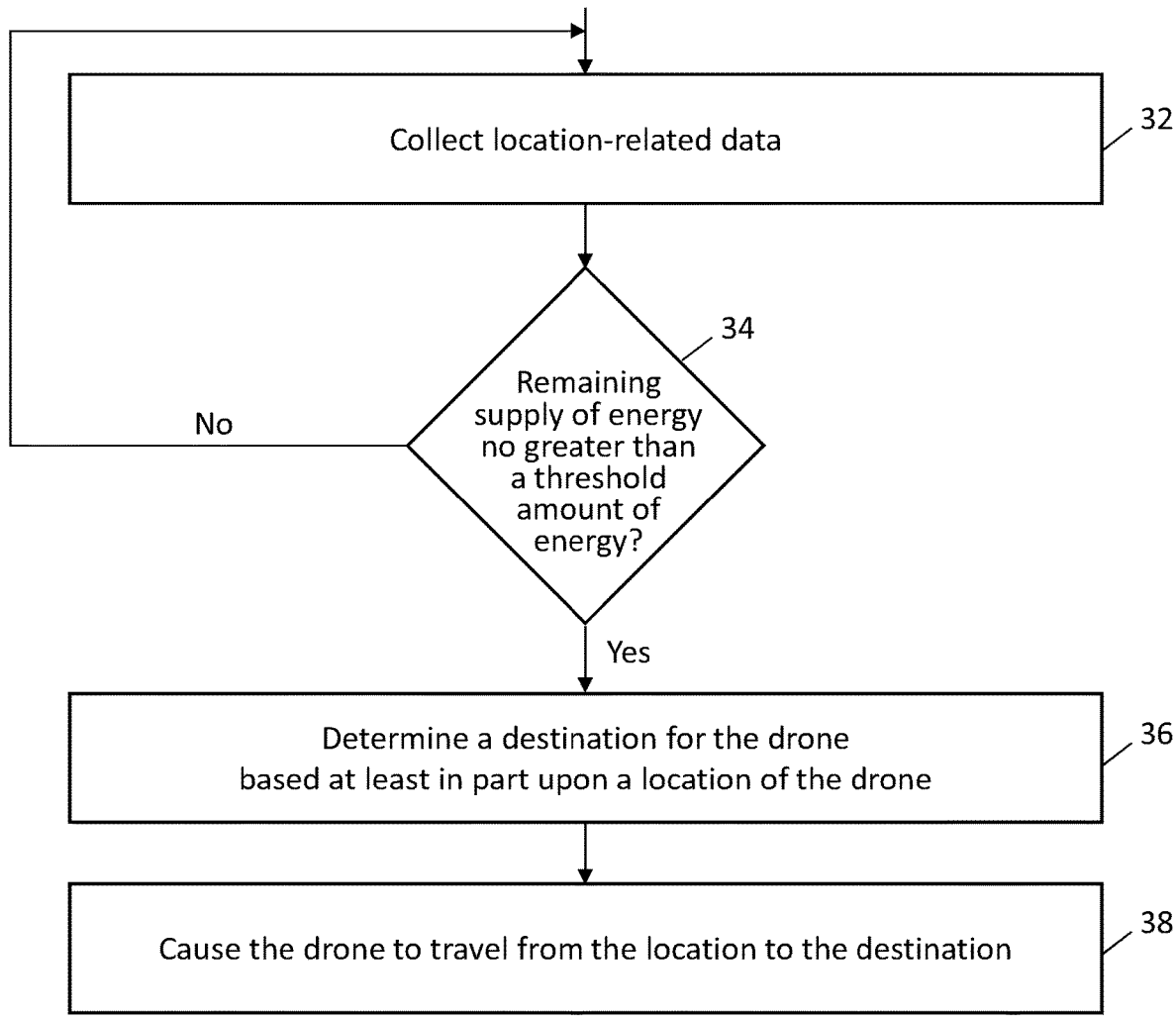
Figure 4:
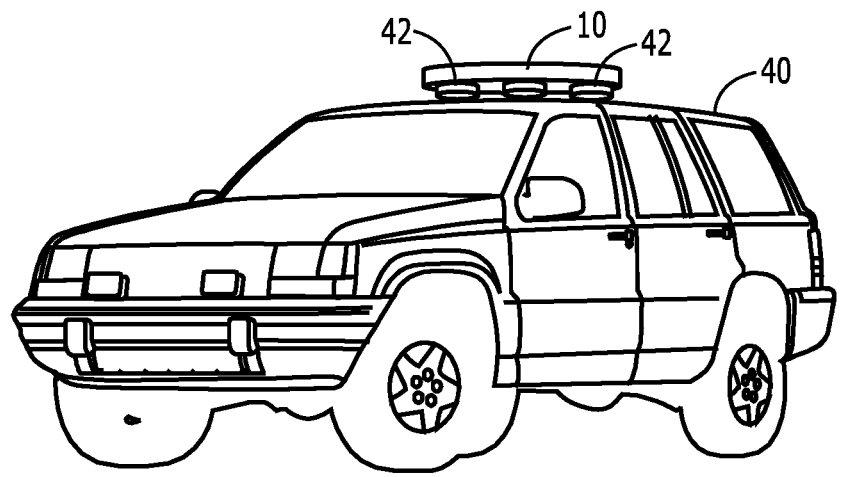
Figure 5:
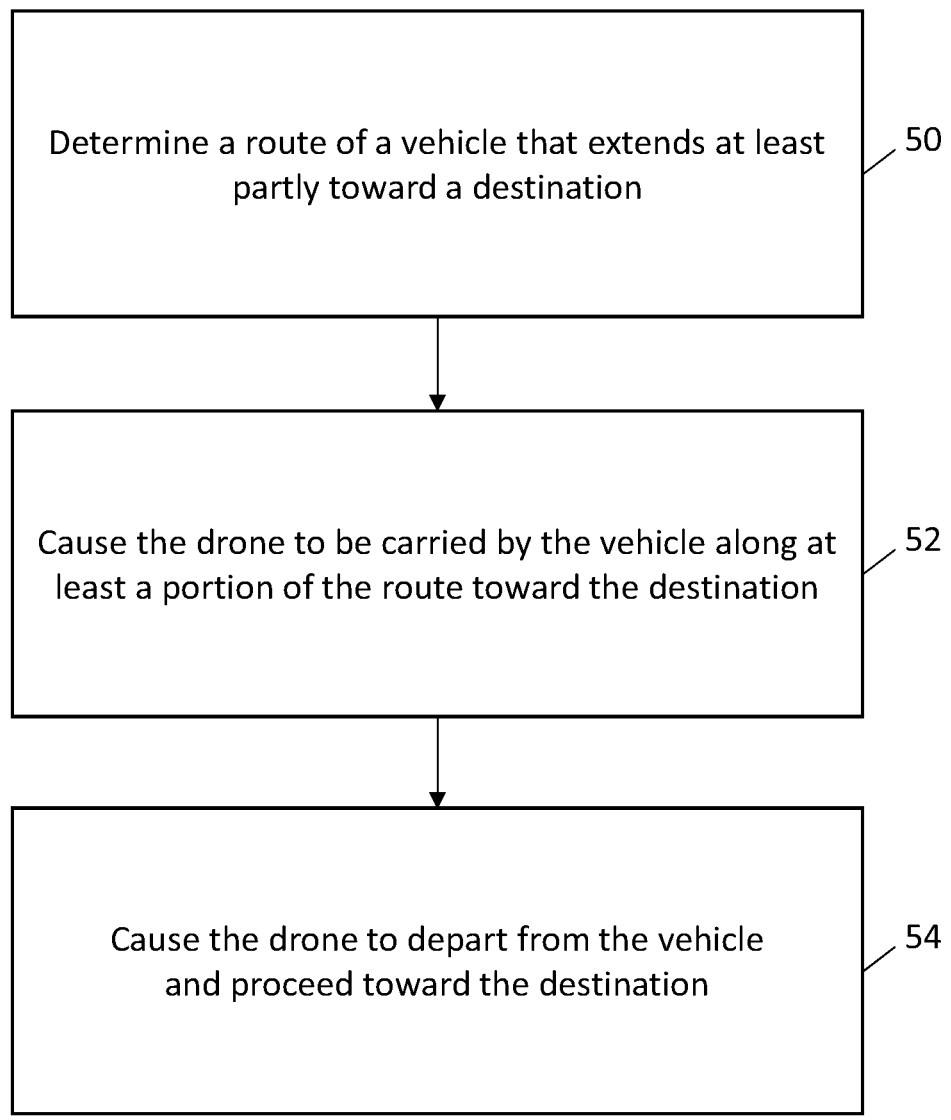

Having thus described certain embodiments of the invention in general terms, reference will now be made to the accompanying drawings, which are not necessarily drawn to scale, and wherein:

FIG. 1 illustrates an overview of a region from which a drone collects location-related data and a plurality candidate destinations scattered throughout the region to which the drone will be directed in accordance with an example embodiment of the present disclosure;

FIG. 2 in a block diagram of an apparatus that may be specifically configured in accordance with an example embodiment of the present disclosure;

FIG. 3 is a flowchart illustrating the operations performed, such as by the apparatus of FIG. 2, in order to dynamically determine the destination of a drone that is collecting location-related data in accordance with an example embodiment of the present disclosure;

FIG. 4 is a perspective view of a vehicle carrying a drone in accordance with an example embodiment of the present disclosure; and FIG. 5 is a flowchart illustrating the operations performed, such as by the apparatus of FIG. 2, in order to determine a vehicle in transit along a route that can carry a drone at least partially toward a destination in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program are provided in accordance with an example embodiment in order to dynamically determine a destination for a drone following deployment of the drone and, in some embodiments, following the collection of location-related data by the drone. By dynamically determining the destination for a drone following the deployment of the drone, such as based upon the location of the drone, a destination may be determined that is closer or otherwise more accessible to the drone from the current location of the drone then the site from which the drone was originally deployed. Consequently, a greater percentage of the range of the drone may be expended to perform the intended function of the drone, such as the collection of location-related data, and a smaller percentage of the range of the drone must be reserved to travel to the destination than if the drone had to cease its intended function at an earlier point-in-time in order to return to the site from which the drone was deployed. As a result, the method, apparatus and computer program product of an example embodiment provide for more fulsome and more efficient collection of location-related data by a drone.

In another embodiment, the range of a drone is extended by relying upon a vehicle that travels along a route, such as a predefined route, to carry the drone at least partially towards the destination. In this regard, the vehicle that will carry the drone may be identified based upon the route of the vehicle that extends at least partly toward the destination of the drone with the drone thereafter being caused to be carried by the vehicle. By relying upon the vehicle for transportation at least partially to the destination, the drone can conserve its limited supply of energy, thereby effectively further increasing its range.

Referring now to FIG. 1, one example of a setting in which a drone 10 may be deployed is depicted. The drone may be any of a variety of unmanned air vehicles (UAVs) or other controllable flying objects. Alternatively, the drone may be a ground-based unmanned vehicle that is configured to travel along a road or other surface. In the example depicted in FIG. 1, the drone is configured to be deployed from a launch site 12 so as to collect location-related data. While a wide variety of location-related data may be collected, examples of location-related data may include data related to roads, such as the location of the roads, the curvature of the roads, the lane markings of the roads, the roughness of the roads as well as attributes associated with the roads, such as the posted speed limits for different segments of the roads, and/or data related to a vehicle traveling along the road, such as the speed and/or heading of the vehicle. However, drones may be deployed in other example embodiments for other purposes, such as the delivery of packages, surveillance for crime prevention or other purposes, photography, etc. However, the use of a drone in order to collect location-related data will generally be described in conjunction with the following embodiments for purposes of example, but not of limitation.

As shown in FIG. 2, an apparatus 20 is provided in accordance with an example embodiment in order to at least partially control the drone 10. The apparatus of this example embodiment may be embodied by any of a variety of computing devices, such as a computer, a mobile terminal, such as a personal digital assistant (PDA), mobile telephone, smart phone, personal navigation device, wearable device, smart watch and/or tablet computer, or a fixed computing device, such as a computer workstation, a navigation system or the like. The computing device of some embodiments is distributed and includes a plurality of computing devices, such as one or more of the computing devices described above, that cooperate in order to perform the functions described below. In an example embodiment, however, the computing device is embodied and carried by the drone.

The apparatus 20 of an example embodiment depicted in FIG. 2 includes, is associated with or is otherwise in communication with a processor 22, a memory device 24 and optionally a communication interface 26. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus, such as other drones and/or a central site or central computer. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

The apparatus 20 of an example embodiment may also include one or more sensors 28, such as an image sensor, e.g., a camera, a radar sensor, an infrared sensor, a light detection and ranging (LIDAR) sensor, a vibration sensor, one or more accelerometers, one or more gyroscopes, a compass or the like. For example, in an embodiment in which the apparatus is embodied or carried by the drone, the drone may also include one or more sensors, such as However, the sensor(s) may, instead, be separate from the apparatus, but in communication with the apparatus, such as via the communication interface 26. For example, in an embodiment in which the apparatus is offboard, but in communication with the drone, the sensor(s) may be carried by the drone so as to be in communication with the apparatus via the communication interface.

The apparatus 20 of an example embodiment may also optionally include or be in communication with a map database 30 that represents road segments in a geographic area that may be utilized, for example, by a drone in order to facilitate its movements. In this regard, the map database contains map data that indicates attributes of the road segments. The map database may also include map data indicative of sidewalks or other types of pedestrian segments, as well as open areas, such as grassy regions or plazas.

The map database 30 may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent bicycle lanes, pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. As noted below, the POIs stored by the map database may include a listing of candidate destinations, such as one or more of disposal sites, recycling centers, recharging stations or collection sites, along with the location and type of each destination. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 30 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation.

As mentioned above, the map database 30 may be a master geographic database, but in alternate or complementary embodiments, a client side map database may represent a compiled navigation database that may be used in or with a drone to provide navigation and/or map-related functions. In such a case, the map database can be downloaded or stored on the drone which can access the map database through a wireless or wired connection, such as a communications network.

With reference now to FIG. 3, the operations performed, such as by the apparatus 20 of FIG. 2, in accordance with an example embodiment in order to at least partially control the drone 10 following the launch of the drone are depicted. As shown in block 32, the apparatus includes means, such as the processor 22, the communications interface 26, one or more sensors 28 or the like, configured to collect location-related data with the drone. In some embodiments, the drone is launched from a launch site 12 and then travels, such as flies, over a region while collecting location-related data regarding the region. In this example embodiment, the location-related data may include images of the region, elevation or other data regarding the terrain or other topographical features, etc. The apparatus of an example embodiment may also include means, such as the processor or the like, configured to control the route traversed by the drone. For example, the apparatus, such as the processor, of an example embodiment, may be configured to direct the drone along a route that was programmed in advance of deployment of the drone. However, various conditions may impact the actual path of travel of the drone including weather conditions, such as wind, that may cause the drone to deviate from the route that was preprogrammed such that the location of the drone following the launch of the drone may be difficult to predict, at least with certainty, in advance of the launch of the drone.

Alternatively, the apparatus 20, such as the processor 22, may be configured to control the drone 10 so as to accompany an entity in motion as the entity travels. While accompanying the entity in motion, the drone of this example embodiment collects location-related data. For example, a vehicle may serve as the entity in motion and may drive along a road with the drone being controlled so as to fly along with the vehicle and therefore accompany the vehicle as the vehicle drives along the road. The drone of this example embodiment is configured to collect location-related data regarding the road along which the vehicle travels. This location-related data may include the location of the road, the curvature of the road, the lane markings on the road and other attributes associated with the road, such as the posted speed limit. While the entity in motion may, in some embodiments, be a vehicle, the drone may be configured to accompany other types of entities in motion, such as a person who is walking or running. In this example embodiment, the drone is controlled so as to accompany the person and to collect location-related data as the drone accompanies the person. For example, the person 44 may be walking or running along a trail as shown in FIG. 1 such that the location-related data collected by the drone may relate to the location and typography of the trail. In still further embodiments, the entity in motion may be a boat and the location-related data collected by the drone while accompanying the boat may relate to the location of the waterway traversed by the boat.

As described above, in an embodiment in which the drone 10 is a UAV, the drone is configured to accompany the entity in motion by flying along with the entity. Alternatively, in an embodiment in which the drone is a ground-based drone, the drone may follow the entity in motion by traversing over the same surface over which the entity travels.

Although the drone 10 is configured to accompany the entity in motion while remaining spaced apart from the entity in motion, the drone of an example embodiment may be configured to accompany the entity in motion, at least for a portion of the time period during which the drone accompanies the entity in motion, by being carried by the entity. For example, the apparatus 20 of an example embodiment may include means, such as the processor 22, communication interface 26 or the like, configured to cause a drone embodied as a UAV that is accompanying a vehicle that travels along a road to detachably mount to and be carried by the vehicle during at least a portion of the travel of the vehicle along the road. In this regard, the apparatus, such as the processor, of an example embodiment may be configured to cause the drone to land on the vehicle, such as upon the roof of the vehicle 40 as shown in FIG. 4, the trunk lid of the vehicle, the truck bed of the vehicle, the bumper of the vehicle or the like. In some embodiments, the drone may be carried by the vehicle without attachment thereto, while in other embodiemnts, drone is configured to be detachably mounted to the vehicle. In these embodiments, the drone may be configured to be detachably mounted to the vehicle in various manners, but, in one embodiment, includes one or more suction cups 42 (see FIG. 4) disposed on the surface of the drone facing the vehicle with the apparatus, such as the processor, being configured to cause the drone to draw at least a partial vacuum within the one or more suction cups so as to secure the drone to the vehicle. In another embodiment, the drone may additionally or alternatively include one or more magnets configured to releasably secure the drone to the vehicle. In some embodiments, the drone may have an aerodynamic shape so as to limit the additional load placed upon the vehicle by carrying the drone. In this regard, portions of the drone, such as wings of the drone, may be swept rearwardly while being carried by the vehicle in order to reduce the aerodynamic impact of the drone upon the vehicle.

Once the drone 10 is carried by the vehicle 40, the apparatus 20, such as the processor 22, is configured to cause the drone of an example embodiment to continue to collect location-related data. As a result of the drone being carried by the vehicle, the drone, such as the processor, one or more sensors 28 or the like, can continue to collect at least some of the same location-related data that was collected while the drone flew along with the vehicle, while, in some embodiments, also collecting additional types of location-related data. For example, while being carried by the vehicle, a drone, such as one or more vibration sensors of the drone, may be configured to detect location-related data relating to the roughness of the road over which the vehicle is traversing that cannot be collected, at least not as accurately, while the drone flies along with the vehicle. Additionally or alternatively, a drone that is carried by the vehicle may include an accelerometer or other sensor so as to detect location-related data relating to the dynamic behavior of the vehicle, such as the acceleration of the vehicle, e.g., the lateral acceleration, the speed of the vehicle, the heading of the vehicle and/or the braking behavior of the vehicle that cannot be collected, at least not as accurately, while the drone flies along with the vehicle. By being carried by a vehicle as the vehicle traverses a road, the supply of energy, such as the battery power and/or fuel, of the drone may be conserved, thereby extending the range of the drone while continuing to collect location-related data. After having been carried by the vehicle, the apparatus, such as the processor, of this example embodiment is configured to cause the drone to depart from the vehicle. In an embodiment in which the drone is detachably mounted to the vehicle while the drone is carried by the vehicle, the drone may be subsequently detached from the vehicle, such as by discontinuing the at least partial vacuum drawn by the suction cups 42, in order to permit the drone to depart from the vehicle. After having departed from the vehicle, the drone may continue to collect location-related data, such as by continuing to fly with vehicle in an embodiment in which drone is a UAV.

Once deployed, a drone 10 has a supply of power, such as battery power, fuel or the like that is limited, even in instances in which a drone includes solar panels or other energy collection devices to supplement the original supply of energy. As such, the range of the drone over which the drone may collect location-related data is correspondingly limited. In order to increase the percentage of the range of the drone that may be utilized for the collection of location-related data relative to the percentage of the range of the drone that is utilized to travel to a destination, such as a disposal site, a recycling station, a recharging site or a collection site, the drone of an example embodiment is not required to return to the site 12 from which the drone is launched. Instead, one or more candidate destinations 14 may be identified, such as shown in FIG. 1. These candidate destinations may be in various locations throughout the region and may include, for example, one or more disposal sites, one or more recycling centers, one or more recharging stations and/or one or more collection sites. The disposal site(s) are sites at which drones may be disposed of following the collection of location-related data. Examples of disposal sites include landfills, recycling centers, dumpsters or other trash receptacles and are generally represented as open containers in FIG. 1. Recharging station(s) are locations at which the source of energy of the drone is recharged, such as by recharging the batteries carried by the drone, refueling the drone or the like, and are represented as a pole-mounted platform in FIG. 1. Collection station(s) are locations at which a drone temporarily resides pending collection, such as the rooftop of a building as shown in FIG. 1. For example, drones may be periodically collected from collection sites and returned to a central facility for recharging, refueling, refurbishment or the like. In one embodiment, recycling centers may be an example of a disposal site with a drone, either in its entirety or partially, be disposed of, such as for parts. Alternatively, in another embodiment, a recycling center may be distinct from a disposal site and may provide for refurbishment of a drone prior to the return of the drone to service.

As shown in block 36 of FIG. 3, after having been deployed and, in some embodiments, after having collected at least some of the location-related data, the apparatus 20 includes means, such as the processor 22 or the like, configured to determine the destination for the drone 10 based at least in part upon the location of the drone, such as the current location of the drone. The location of the drone at a point in time following deployment is generally unknown at the time of deployment, at least with respect to the exact location of the drone. As noted above, the deployment of a drone to fly throughout a region to collect location-related data may cause the drone to be subject to wind or other weather conditions that may cause the location of the drown to deviate from a predefine route. Alternatively, in an embodiment in which the drone is configured to accompany an entity in motion, such as a vehicle or person, the location of the drone is dependent upon the route taken by the vehicle or person and is unknown in advance of the deployment of the drone. Thus, the apparatus, such as the processor, of this example embodiment is configured to dynamically determine the destination for the drone following the deployment of the drone based upon the location of the drone, such as the current location of the drone.

The candidate destinations 14 may be predefined and stored in memory 24 on board the drone 10. Alternatively, the candidate destinations may be stored in memory off board the drone. Still further, the candidate destinations may be stored by the map database 30, either on or off board the drone. The apparatus 20, such as the processor 22, of an example embodiment may be configured to determine the one or more candidate destinations that are within the remaining range of the drone based upon the existing supply of energy of the drone. For example, the apparatus, such as the processor, may be configured to determine the distance to each of a plurality of candidate destinations and may also be configured to then determine the amount of energy required for the drone to travel that distance to each of the candidate destinations. By comparing the energy required to travel to each of the candidate destinations to the remaining supply of energy on board the drone, the apparatus, such as the processor, is configured to determine which one or more of the candidate destinations is within the remaining range of the drone. In an instance in which a single candidate destination lies within the remaining range of the drone, the apparatus, such as the processor, is configured to determine that single candidate destination to be the destination for the drone. However, in an instance in which two or more candidate destinations lie within the remaining range of the drone, the apparatus, such as the processor, may be configured to select one of the candidate destinations within the remaining range of the drone as the destination for the drone. This selection may be based upon various factors. For example, the candidate destinations may be prioritized, such as based upon the type of destination and/or the accessibility of the destination. Alternatively, the destination from among the plurality of candidate destinations within the remaining range of the drone that is closest to the drone may be determined to be the destination for the drone in order to conserve energy.

As shown in block 38 of FIG. 3, the apparatus 20 of this example embodiment also includes means, such as the processor 22, the communication interface 26 or the like, for causing the drone 10 to travel from the location, such as the current location of the drone, to the destination that has been determined. In an embodiment in which the drone is accompanying an entity that is in motion, the destination is determined while the drone continues to accompany the entity and, once the destination has been determined, the drone is caused to deviate from the entity so as to travel to the destination. In an instance in which the destination is a recharging station or a collection site, the drone may be recharged or collected, respectively, prior to being placed back in service.

In an example embodiment, the destination may be mobile, such as a waste management truck 46 that is driven along a route as shown in FIG. 1 to collect waste from homes or other facilities. As such, the location of the destination may change over time. However, taking into account the location of the mobile destination over time, the destination may still be selected and, in this instance, the apparatus 20, such as the processor 22, is configured to cause the drone 10 to travel to the current location of the destination. In an instance in which the drone is embodied as a UAV and the destination is a waste management truck, for example, the apparatus, such as the processor, is configured to cause the drone may be flown into the waste management truck, which serves as a disposal site for the drone.

With respect to the location-related data collected by the drone 10, the apparatus 20 of an example embodiment includes means, such as the processor 22, the communication interface 26 or the like, for causing the location-related data to be transmitted off board the drone while the drone remains in service and continues to collect additional location-related data. For example, the location-related data may be transmitted to a server or other computing device configured to store and/or process the location-related data, such as for purposes of updating a map. However, in embodiments in which the destination that is determined for the drone is a recharging station or a collection site, the location-related data collected by the drone may be stored by memory 24 on board a drone and may be downloaded after the drone has reached the recharging station or the collection site and/or after the drone has been returned, such as to a central facility.

In an example embodiment, the apparatus 20 includes means, such as the processor 22 or the like, configured to monitor the remaining energy on board and available to the drone 10. In an example embodiment, a threshold amount of energy is predefined and is indicative of the amount of energy that must remain available to the drone at the time at which the destination for the drone is dynamically determined. As such, the apparatus of this example embodiment includes means, such as the processor or the like, configured to determine the destination for the drone in an instance in which the remaining supply of energy for the drone is determined to be no greater than the threshold amount of energy. See block 34 of FIG. 3. Thus, the apparatus, such as the processor, of this example embodiment is configured to determine when the remaining supply of energy for the drone is no greater than the threshold amount of energy and to utilize that determination to trigger the determination of the destination for the drone.

In some embodiments, a plurality of drones 10 may be concurrently deployed and the drones may be configured to communicate with one another. This inter-drone communication may be utilized for various purposes. For example, in some embodiments, it may be desirable for a drone to communicate with a central facility or other central computer, but the drone may not be capable of such communication, such as in instances in which the drone is too far removed from the central facility. In these instances, the drone may communicate via inter-drone communication with one or more other drones that may, in turn, relay the message from the drone to the central facility or other central computer, either directly or via one or more additional drones. This communication may relate, for example, to the transmission of the location-related data collected by the drone to the central facility, a central computer or the like.

In other embodiments, a drone 10 that is configured to accompany a vehicle may be following the vehicle that is driving along a new road 16. The new road may split into two or more branches, but the drone may only be able to follow one of the branches, such as the branch along which the vehicle proceeds. Since it would be advantageous to also collect location-related data related to the other branches of this new road, the drone may be configured to communicate with other drones, such as via inter-drone communication, in order to advise the other drones as to the location at which the new road split into multiple branches and to request that one or more of the other drones proceed to the location and travel along the other branches of the new road in order to collect location-related data relating thereto.

In order to increase the percentage of the range of a drone 10 that it utilized for its intended purpose, such as to collect location-related data, to deliver a package, to conduct surveillance of a target or the like, the apparatus 20 of an example embodiment is configured to cause a drone to be transported at least part of the way to the destination by a vehicle 40. As shown in block 50 of FIG. 5, the apparatus of an example embodiment includes means, such as the processor 22, the memory 24 or the like, configured to determine that a vehicle is traveling along a route, such as a predefined route, that extends partly toward a destination of the drone. For example, following deployment of the drone and the determination of the destination for the drone, the apparatus, such as the processor, is configured to determine the route, such as the predefined route, of each of one or more vehicles and to identify any one or more of the routes that extend at least partly toward the destination. In this example embodiment, following deployment, the drone may have been performing any of a variety of different functions including the collection of location-related data, the delivery of a package, the surveillance of a target or the like. As described above in conjunction with block 36 of the embodiment of FIG. 3, following the deployment of the drone, the destination, such as a disposal site, a recycling station, a recharging station, a collection site or the like, may be determined. In some embodiments, the destination is one of a plurality of destinations, such as one disposal site from among a plurality of disposal sites. In this example embodiment, the apparatus, such as the processor, is configured to select one destination of the plurality of destinations based on a current location of the drone and routes of vehicles traveling toward at least some of the plurality of destinations, such as by selecting the destination for which the greatest percentage of the distance from the current location of the drone to the selected destination is spanned by the route of a vehicle. Based upon the destination that is determined, the apparatus, such as the processor, may consider the routes, such as the predefined routes, of the plurality of vehicles and determine the one or more vehicles having a route that extends at least partly toward the destination.

A variety of vehicles may have routes, such as predefined routes, that may be evaluated for purposes of transporting the drone. For example, buses, such as city buses or school buses, may have predefined routes stored, for example in a database, such as the map database 30, that is accessible by the processor 22. Similarly, trains may have predefined routes that are also stored in a database, such as the map database. Still further, personal vehicles may include navigation systems that may define a predefined route for the respective vehicle with the predefined route again being stored in a database, such as the map database. From among the plurality of routes, such as the predefined routes, for the plurality of vehicles, the apparatus 20, such as the processor 22, is configured to determine the one or more vehicles having a route that extends at least partly toward to a destination, as shown in block 50 of FIG. 5. In an embodiment in which a plurality of vehicles have a route that extends at least partly toward the destination, the apparatus, such as the processor, is configured to identify the route of one of the vehicles that extends at least partly toward the destination as the route to be utilized. The route of a vehicle that is determined from among the routes of a plurality of vehicles may be determined in various manners including the route of a vehicle that extends closest to the destination or that covers the greatest expanse of distance between the current location of the drone 10 and the destination.

Once the route of the vehicle that extends partly toward the destination has been determined, the apparatus 20 of an example embodiment includes means, such as the processor 22, the communication interface 26 or the like, for causing the drone 10 to be carried by the vehicle 40, such as by being detachably mounted to and carried by the vehicle, along at least a portion of the route of the vehicle toward the destination. See block 52 of FIG. 5. As shown in FIG. 4 and as described above, the drone may be configured to be carried by various portions of the vehicle, such as the roof, the trunk lid, the truck bed, the bumper or the like of the vehicle. While being carried by the vehicle, the supply of energy of the drone may be conserved.

As shown in block 54 of FIG. 5, the apparatus 20 of this example embodiment also includes means, such as the processor 22, the communication interface 26 or the like, for causing the drone 10 to depart from the vehicle 40, such as by detaching from the vehicle in an embodiment in which the drone was previously mounted to the vehicle, and proceed toward the destination after having been carried by the vehicle along at least a portion of the route. For example, the apparatus, such as the processor, may be configured to monitor the location of the drone as the drone is carried by the vehicle and to compare the location of the drone relative to the route of the vehicle. Upon reaching the portion of the route of the vehicle that is closest to the destination, the apparatus, such as the processor, of this example embodiment is configured to cause the drone to depart from the vehicle and proceed toward the destination, thereby reducing the expenditure of energy by the drone while being carried toward the intended destination.

As described the drone 10 of an example embodiment need not return to the site 12 from which the drone was launched but, instead, a destination for the drone may be dynamically determined while the drone is in the field, thereby permitting the drone to travel to a destination that is closer to its current location and increasing the amount of time that the drone is able to collect location-related data. The amount of time that a drone is able to perform its intended function, such as the collection of location-related data, may also be increased in an example embodiment by causing the drone to be carried by a vehicle toward the destination with the vehicle that carries the drone having been selected based upon the route, such as the predefined route, traveled by the vehicle. By dynamically determining the destination of the drone, the method, apparatus and computer program product of an example embodiment need not know in advance the route that the drone will follow following deployment such that the drone has greater freedom in the collection of the location-related data.

FIGS. 3 and 4 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific That which is claimed:

1. A method comprising:
collecting location-related data, wherein collecting location-related data comprises collecting location-related data with a drone that accompanies an entity in motion as the entity travels, and wherein the location-related data relates to a road along which the entity travels including one or more of a curvature of the road, markings of the road or a roughness of the road;
while the drone accompanies the entity as the entity travels, determining a destination for the drone from among one or more of disposal sites or recycling stations based at least in part upon a location of the drone during travel of the drone, wherein the destination is unknown at a time of deployment of the drone; and
causing the drone to deviate from the entity to travel to the destination.

2. A method according to claim 1 wherein the entity in motion is a person or a vehicle, and wherein the drone follows the person or the vehicle.

3. A method according to claim 1 wherein the entity in motion is a vehicle, and wherein the drone is located on the vehicle while collecting location-related data.

4. A method according to claim 1 wherein determining the destination comprises determining the destination with reference to information defining respective locations of the plurality of candidate destinations.

5. A method according to claim 1 wherein determining the destination comprises determining the destination based at least in part upon a remaining range of the drone.

6. A method according to claim 5 wherein causing the drone to deviate from the entity in motion comprises causing the drone to deviate from the entity while the destination is within the remaining range of the drone.

7. A method according to claim 1 wherein collecting data with the drone comprises collecting the location-related data with the drone that travels along with the entity in motion such that the location of the drone is dependent upon a route of the entity and is unknown to the drone in advance.

8. A method according to claim 1 further comprising:
determining a remaining supply of energy for the drone; and
in an instance in which the remaining supply of energy for the drone is determined to be no greater than a threshold amount of energy, triggering determination of the destination for the drone.

9. A method according to claim 1 wherein determining the destination comprises prioritizing one or more of a plurality of candidate destinations based upon one or more of a type of destination or an accessibility of the destination.

10. An apparatus comprising at least one processor and at least one non-transitory memory including computer program code instructions stored therein, the computer program code instructions configured to, when executed by the at least one processor, cause the apparatus at least to:
collect location-related data with a drone, wherein the location-related data relates to a road including one or more of a curvature of the road, markings of the road or a roughness of the road;
after having collected at least some of the location-related data, determine a destination for the drone based at least in part upon a location of the drone, wherein the destination is unknown at a time of deployment of the drone, and wherein the apparatus is caused to determine the destination from among one or more disposal sites or recycling stations; and
cause the drone to travel from the location to the destination.

11. An apparatus according to claim 10 wherein the computer program code instructions are configured to, when executed by the at least one processor, cause the apparatus to determine the destination by determining the destination with reference to information defining respective locations of a plurality of candidate destinations.

12. An apparatus according to claim 10 wherein the computer program code instructions are configured to, when executed by the at least one processor, cause the apparatus to determine the destination by determining the destination based at least in part upon a remaining range of the drone.

13. An apparatus according to claim 12 wherein the computer program code instructions are further configured to, when executed by the at least one processor, cause the apparatus to cause the drone to travel along a route while collecting the location-related data, and wherein the computer program code instructions are configured to, when executed by the at least one processor, cause the drone to travel from the location to the destination by causing the drone to deviate from the route while the destination is within the remaining range of the drone.

14. An apparatus according to claim 10 wherein the one or more disposal sites comprise a mobile disposal site.

15. An apparatus according to claim 10 wherein the computer program code instructions are further configured to, when executed by the at least one processor, cause the apparatus to determine a remaining supply of energy for the drone, and wherein, in an instance in which the remaining supply of energy for the drone is determined to be no greater than a threshold amount of energy, the computer program code instructions are configured to, when executed by the at least one processor, trigger the apparatus to determine the destination for the drone.

16. A method comprising:
determining that a vehicle is traveling along a route;
selecting a disposal site from among a plurality of destinations for a drone that is accompanying the vehicle based on the route of the vehicle;
causing the drone to be carried by the vehicle along at least a portion of the route toward the disposal site;
after having been carried by the vehicle along at least the portion of the route, causing the drone to depart from the vehicle and proceed toward the disposal site; and
disposing of the drone at the disposal site.

17. A method according to claim 16 wherein determining that the vehicle is traveling along the route comprises determining the route of the vehicle based at least in part upon a location of the drone.

18. A method according to claim 16 wherein determining that the vehicle is traveling along the route comprises determining the route of the vehicle based upon information defining respective routes of a plurality of vehicles.

19. A method according to claim 16 wherein the destination is unknown at a time of deployment of the drone, and wherein the method further comprises collecting location-related data with the drone while accompanying the vehicle prior to being carried by the vehicle and collecting one or more additional types of location-related data while being carried by the vehicle in comparison to the location-related data collected prior to being carried by the vehicle.

20. A method according to claim 16 wherein the drone is caused to be carried by and to subsequently depart from the vehicle such that a remaining range of the drone while being carried by the vehicle is sufficient to reach the disposal site following departure from the vehicle.

21. A method according to claim 16 wherein selecting the disposal site is based on an extent of a distance from a current location of the drone to the disposal site that is spanned by the route of the vehicle.

22. An apparatus comprising at least one processor and at least one non-transitory memory including computer program code instructions stored therein, the computer program code instructions configured to, when executed by the at least one processor, cause the apparatus at least to:
   collect location-related data with a drone while accompanying a vehicle in motion;
   determine that the vehicle accompanied by the drone is traveling along a route;
   cause a drone to be carried by the vehicle along at least a portion of the route; and
   collect location-related data that is of a different type or different accuracy while being carried by the vehicle in comparison to the location-related data collected prior to being carried by the vehicle including collection of location-related data provided by one or more vibration sensors of the drone relating to a roughness of a road traversed by the vehicle or location-related data provided by an accelerometer or other sensor of the drone relating to dynamic behavior of the vehicle.

23. An apparatus according to claim 22 wherein the computer program code instructions are configured to, when executed by the at least one processor, cause the apparatus to determine that the vehicle is traveling along the route by determining the route of the vehicle based at least in part upon a location of the drone.

24. An apparatus according to claim 22 wherein the computer program code instructions are configured to, when executed by the at least one processor, cause the apparatus to determine that the vehicle is traveling along the route by determining the route of the vehicle based upon information defining respective routes of a plurality of vehicles.

25. An apparatus according to claim 22 wherein the drone is caused to be carried by and to subsequently depart from the vehicle such that a remaining range of the drone while being carried by the vehicle is sufficient to reach a respective destination following departure from the vehicle.

26. An apparatus according to claim 22 wherein the computer program code instructions are further configured to, when executed by the at least one processor, cause the apparatus to:
   select a respective destination from among a plurality of destinations for a drone based on an extent of a distance from a current location of the drone to the respective destination that is spanned by the route of the vehicle, wherein the drone is caused to be carried by the vehicle toward the respective destination after having selected the respective destination; and
   after having been carried by the vehicle along at least the portion of the route, cause the drone to depart from the vehicle and proceed toward the respective destination.

* * * * *